United States Patent Office 3,345,349
Patented Oct. 3, 1967

3,345,349
COPOLYMERIZATION OF CONJUGATED DIOLE-
FINS WITH MONO-OLEFIN HYDROCARBON
MATERIAL IN THE PRESENCE OF VANADYL
CHLORIDE
Noboru Yamada, Keizo Shimada, and Hiroshi Ichida, Yamaguchi-ken, Japan, assignors to Teijin Limited, Nishi-ku, Osaka, Japan, a corporation of Japan
No Drawing. Filed Apr. 26, 1963, Ser. No. 276,097
Claims priority, application Japan, Apr. 30, 1962, 37/17,783; Apr. 2, 1963, 38/16,880
6 Claims. (Cl. 260—85.3)

This invention relates to a method of copolymerizing conjugated diolefins with monoolefin hydrocarbons.

Heretofore, oily or rubber-like polymers have been manufactured from monoolefin hydrocarbons such as propylene and isobutylene by polymerizing the same in the presence of a so-called Friedel-Crafts type catalyst such as anhydrous aluminum chloride.

The method of this invention is that for copolymerizing monoolefin hydrocarbons with conjugated diolefins wherein vanadyl chloride ($VOCl_3$) is used as the catalyst.

Vanadyl chloride exhibits catalytic activity markedly different from that of the so-called Friedel-Crafts type catalyst such as anhydrous aluminum chloride. Namely, while anhydrous aluminum chloride, as is known, is used as a catalyst in the polymerization of isobutylene, vanadyl chloride shows practically no catalytic activity in the polymerization of isobutylene. Again, according to our research, it is found that vanadyl chloride has a very high catalytic activity in polymerization of conjugated diolefins such as isoprene or butadiene, and quickly polymerizes the same even under low temperatures. In contrast to this, anhydrous aluminum chloride and other Friedel-Crafts type catalysts show remarkably less activity in polymerization of conjugated diolefins. According to the method of this invention, by using vanadyl chloride ($VOCl_3$) as the catalyst, monoolefin hydrocarbons can be quickly copolymerized with conjugated diolefins such as isoprene and butadiene in a good yield. Particularly, this invention is based on the discovery of the fact that such a monomer which is by itself hardly polymerizable by vanadyl chloride catalyst as isobutylene can be polymerized upon addition of a minor amount of conjugated diolefin. The copolymers obtained by the present method have wide and valuable utilities as synthetic resins, elastomer, or adhesive agent, etc.

While vanadyl chlorides includes a number of compounds such as those represented generally by the formulae $VOCl_3$, $VOCl_2$, $VOCl$ and $V_2O_2Cl$, among these, the vanadyl chloride having the formula $VOCl_3$ is used particularly as the catalyst in this invention. Hence, vanadyl chloride, as used herein, refers to the vanadyl chloride having the formula $VOCl_3$ unless indicated otherwise.

While all the compounds represented by the formulae $VOCl_2$, $VOCl$ and $V_2O_2Cl$ are solid at room temperature, the vanadyl chloride ($VOCl_3$) used as the catalyst in this invention is liquid (boiling point 126–127° C.) at room temperature. This vanadyl chloride may be obtained, for example, by mixing vanadium trioxide ($V_2O_3$) and carbon, heating the mixture to about 400° C. while passing through dry chlorine gas, and thereafter distilling and purifying the resulting reaction product. It may also be possible to prepare said vanadyl chloride from phosphorus pentoxide and vanadium pentoxide. However, the process by which vanadyl chloride is prepared is of course not critical, it being possible to use according to this invention, as the catalyst therefor, vanadyl chloride produced by any process.

The vanadyl chloride used in the method of this invention which is a yellow liquid having boiling point of 126–127° C., as described above, is characterized in that it reacts with water or alcohol and decomposes.

The conjugated diolefins useful for the copolymerization of the present invention include, for example, butadiene - 1,3, isoprene (2 - methylbutadiene - 1,3), 2,3 - dimethylbutadiene-1,3, 2,3-dimethylpentadiene-1,3, 2,4-dimethylpentadiene - 1,3, 2,3,4 - trimethylheptadiene-1,3, 2-ethylbutadiene - 1,3, 2-phenylbutadiene-1,3, 2,3-diphenylbutadiene - 1,3, 2 - methylpentadiene-1,3, 2 - methylhexadiene-1,3, 2,5-dimethylhexadiene-2,4, 7-methyl-3-methylene-1, 6-octadiene and other polymerizable methyl-, ethyl-, isopropyl-substituted butadienes, pentadienes, hexadienes, and heptadienes.

The monoolefin hydrocarbons copolymerizable with the conjugated diolefins according to the invention include, for example, propylene, n-butene-1, isobutylene, pentene-1, isopentene, hexene-1, isohexene, and other methyl-, ethyl-, propyl-, isopropyl-substituted α-olefins of 4–10 carbons, and certain 2-olefins such as butene-2, 2-methylbutene-2. Again the monoolefin hydrocarbons include aryl-substituted monoolefin hydrocarbons such as styrene, vinyltoluenes, α-methylstyrenes, and vinyl naphthalenes. Mixtures of two or more of the foregoing are also usable.

The copolymerization of conjugated diolefins with monoolefin hydrocarbons according to the invention is practiced under optional presence of an inert organic solvent, the presence of an inert organic solvent however being preferred. As such inert organic solvent, saturated hydrocarbons such as hexane, heptane, octane, or halogenated hydrocarbons such as methylene chloride, ethylene chloride, chloroform, carbon tetrachloride are suitable, and those which do not contain compounds having active hydrogen such as water and alcohol are used.

The method of this invention may be practiced as follows:

To the mixture of one or more of conjugated diolefins (for example, isoprene) with one or more of monoolefin hydrocarbons such as isobutylene, vanadyl chloride is added in the absence of oxygen and water, and in the optional presence of an inert solvent, mixed at temperatures ranging from −100° to 100° C., preferably −70° to 50° C. and reacted. The pressure condition may be any of the state, reduced, normal, or elevated. The polymerization progresses rapidly. After completion of the reaction, alcohol is added to the polymeric mixture to stop the reaction. By the addition of alcohol, the catalyst decomposes, and the reactant liquid mixture turns brown from green or yellow color, and white or somewhat colored polymer precipitates. The precipitated polymer is separated, dissolved in n-heptane, benzene, etc., and re-precipitated by addition thereto of alcohol. After separation, the re-precipitated polymer is further washed thoroughly with alcohol, thereby to be removed of catalyst residues and refined. The alcohol to be used in these operations may be any of methyl, ethyl, or isopropyl alcohols. Thus obtained polymer is amorphous rubber-like substance or solid, sometimes containing insoluble, white powdery portions insoluble in heptane or benzene.

The amount of vanadyl chloride used is 0.1–10% by weight, preferably 0.5–5% by weight, based on the total of the weight of the conjugated diolefin, monoolefin hydrocarbon and the inert organic solvent. The inert organic solvent, on the other hand, is generally used in an amount preferably from 0.5 to 10 times by weight of the conjugated diolefin and monoolefin. The amount of conjugated diolefin is within 0.001–10 by weight ratio to monoolefin hydrocarbon, preferably within the range of 0.01–0.5.

For a still clearer understanding of the invention, the following examples are given.

Example 1

Ten (10) millimols of vanadyl chloride were filled in an ampoule in dry nitrogen current. Said ampoule was them packed in a 100 cc. pressure bottle together with 50 cc. of refined n-heptane and 0.0504 mol (3.43 g.) of refined isoprene. The bottle was then cooled in a Dry Ice-acetone bath of −70° C., removed of air, and was added with 0.163 mol (9.41 g.) of refined isobutylene (isobutylene/isoprene=3.24 mol ratio).

The reaction vessel was then taken out of the cooling bath. When the vessel as a whole reached the reaction temperature of 0° C., the ampoule of vanadyl chloride was broken and the polymerization was started. The polymerization continued for 65 hours at the temperature of 0° C. After the polymerization was completed, the reaction mixture was poured into 500 cc. of cold methanol. The precipitated polymer at the bottom was taken out, dissolved in 50 cc. of heptane, and again poured into 500 cc. of methanol to be refined. After further several washes with methanol, the precipitate was dried under reduced pressure. A rubber-like polymer resulted. The yield was 11.7 g., the yielding ratio was 91.0%, and the polymer had an intrinsic viscosity ($\eta$) of 0.175 (measured in toluene at 30° C.). The same was confirmed to be a copolymer of isoprene with isobutylene by infrared absorption spectrum.

Examples 2–10

All the operational conditions were identical as of Example 1.

Example 11

An ampoule filled with 10 millimols of vanadyl chloride, 50 cc. of ethyl chloride, 0.0504 mol of isoprene, and 0.163 mol of isobutylene were packed in a 100 cc. pressure bottle, eliminated of air, and polymerized at 0° C. for 42 hours. The finishing treatments were the same as in Example 1. 7.82 g. of rubber-like polymer were obtained. The yield was 60.9%.

Example 12

Ten (10) millimols of vanadyl chloride were filled in an ampoule in dry nitrogen current. The ampoule then was packed in a 100 cc. pressure bottle together with 50 cc. of refined n-heptane, 0.0504 mol (5 cc. at 20° C.) of refined isoprene and 0.131 mol (15.0 cc. at 20° C.) of styrene. Air was removed from the bottle. When the reaction vessel as a whole reached the reaction temperature of 0° C., the ampoule was broken to start the polymerization. After 18 hours of polymerization, entirely solidified reaction mixture was poured into 50 cc. of cold methanol. And the polymer was pulverized, and subjected to several further washings with methanol, thereby 12.8 g. of white polymer powder were obtained. The yield was 75.8%.

Example 13

All the operations are same to the above Example 11, except changing the kinds of the solvents used.

| Solvent (cc.) | Monomer | | | Vanadyl Chloride (millimol) | Reaction Conditions | | Yield (percent) |
|---|---|---|---|---|---|---|---|
| | Isoprene (mol) | Styrene (mol) | Mol Ratio styrene/isoprene | | (° C.) | (hrs.) | |
| Carbon tetrachloride (50) | 0.504 | 0.131 | 2.60 | 10 | 0 | 18 | 99.7 |
| Ethyl chloride (50) | 0.504 | 0.131 | 2.60 | 10 | 0 | 18 | 99.6 |
| Methylene chloride (50) | 0.504 | 0.131 | 2.60 | 10 | 0 | 18 | 59.8 |

Example 14

An ampoule filled with 10 millimols of vanadyl chloride, 0.0504 mol (3.43 g.) of isoprene, 0.139 mol (9.82 g.) of 2-methylbutene-1, and 50 cc. of ethyl chloride were packed in a 100 cc. pressure bottle, and air was removed from the bottle. Then at the reaction temperature of 0° C., the mixture was polymerized for 18 hours. The finishing treatments were the same as of Example 1. A rubber-like polymer in an amount of 6.78 g. was obtained. The yield was 51.1%.

Example 15

Ten (10) millimols of vanadyl chloride were filled in an ampoule in dry nitrogen current. The catalyst ampoule was packed in a 100 cc. pressure glass bottle together with 30 cc. of refined n-heptane. The bottle was then cooled to −70° C., and thereafter added with 0.012 mol (0.65 g.) of refined butadiene and 0.357 mol (10 g.) of refined isobutylene. The reaction vessel was then withdrawn from the cooling tank, and when its temperature reached 0° C., the catalyst ampoule therein was broken to start polymerization. After 50 hours of polymerization at 0° C. under stirring, the resultant polymeric mixture was poured into methanol. The precipitated polymer was separated and washed with methanol to be refined. Upon drying the same under reduced pressure, 18.6g. of rubber-like polymer were obtained, which had an ($\eta$) of 0.125 (measured in toluene at 25° C.).

| Ex. No. | Solvent (n-heptane) (cc.) | Monomer | | | Vanadyl Chloride | Reaction Condition | | Yield (percent) |
|---|---|---|---|---|---|---|---|---|
| | | Isoprene (mol) | Isobutylene (mol) | Mol Ratio (isobutylene/isoprene) | | (° C.) | (hrs.) | |
| 2 | 50 | 0.101 | 0.112 | 1.11 | 10 | 0 | 65 | 58.5 |
| 3 | 50 | 0.0201 | 0.244 | 12.1 | 10 | 0 | 65 | 82.5 |
| 4 | 50 | 0.0101 | 0.212 | 21.0 | 10 | 0 | 65 | 76.6 |
| 5 | 50 | 0.0020 | 0.222 | 110.0 | 10 | 0 | 65 | 20.3 |
| 6 | 50 | 0 | 0.244 | ∞ | 10 | 0 | 65 | 3.9 |
| 7 | 20 | 0.0504 | 0.163 | 3.24 | 10 | +30 | 20 | 74.2 |
| 8 | 20 | 0.0504 | 0.163 | 3.24 | 10 | 0 | 20 | 68.1 |
| 9 | 20 | 0.0504 | 0.163 | 3.24 | 10 | −30 | 20 | 1.86 |
| 10 | None | 0.0504 | 0.163 | 3.24 | 10 | 0 | 20 | 73.6 |

Example 16

An ampoule filled with 10 millimols of vanadyl chloride was packed in a 100 cc. pressure glass bottle together with 30 cc. of ethyl chloride. The bottle was then cooled to −70° C., thereafter 0.027 mol of refined butadiene and 0.357 mol (10 g.) of refined isobutylene were introduced thereinto under reduced pressure. When the temperature of the reaction vessel was raised to 0.° C., the catalyst ampoule was broken, and the mixture was stirred for 42 hours at that temperature. The resultant polymeric mixture was treated similarly as in Example 15. 15.3 g. of a rubber-like polymer were obtained, which had an ($\eta$) of 0.146.

Example 17

An ampoule filled with 10 millimols of vanadyl chloride was packed in a 100 cc. pressure bottle in dry nitrogen current, together with 30 cc. of refined n-heptane and 0.214 mol of refined 2-methylbutene-1. The bottle was then cooled to −70° C., reduced of its inside pressure, introduced with 0.120 mol of refined butadiene, and withdrawn from the cooling tank. When the temperature of the reaction vessel as a whole rose to 0° C., the catalyst ampoule was broken to start the polymerization. After 60 hours of polymerization and finishing treatments similar to those of Example 15, 5 g. of polymer were obtained.

Example 18

An ampoule filled with 10 millimols of vanadyl chloride was packed in a 100 cc. pressure glass bottle together with 30 cc. of refined n-heptane and 0.091 mol of 2.5-dimethyl-2,4-hexadiene. The bottle was cooled to −70° C., reduced of its inside pressure, and introduced with 0.228 mol. (12.8 g.) of refined isobutylene. When the temperature of the reaction vessel as a whole reached 0° C., the catalyst ampoule was broken to start the polymerization. After 35 hours of polymerization at 0° C., the resultant polymeric mixture was treated as in Example 15, thereby 2 g. of tacky polymer were obtained.

What is claimed is:

1. A method of preparing a solid or rubbery copolymer from a conjugated acyclic diolefin and a mono-olefin hydrocarbon having 3–12 carbon atoms which comprises copolymerizing said conjugated acyclic diolefin with said mono-olefin hydrocarbon in the presence of an inert organic solvent and a catalyst consisting of $VOCl_3$ being in an amount of 0.1 to 10% based on the total weight of said conjugated acyclic diolefin, said monoolefin hydrocarbon and said inert organic solvent.

2. A method in accordance with claim 1 wherein said catalyst consisting of $VOCl_3$ is used in an amount of 0.5 to 5% based on the total weight of said conjugated diolefin, said mono-olefin hydrocarbon and said inert organic solvent.

3. Method in accordance with claim 1, wherein isoprene is used as the conjugated diolefin.

4. Method in accordance with claim 1, wherein butadiene is used as the conjugated diolefin.

5. Method in accordance with claim 1, wherein a mixture of isoprene and butadiene is used as the conjugated diolefin.

6. Method in accordance with claim 1 wherein isobutylene is used as the monoolefin hydrocarbon.

References Cited

UNITED STATES PATENTS

| | | | |
|---|---|---|---|
| 3,251,815 | 5/1966 | Yamada et al. | 260—94.3 |
| 3,168,501 | 2/1965 | Tocker | 260—85.3 |
| 2,122,826 | 7/1938 | Peski | 260—85.3 |
| 2,476,000 | 7/1949 | Sparks et al. | 260—85.3 |

JOSEPH L. SCHOFER, *Primary Examiner.*

JAMES A. SEIDLECK, *Examiner.*

E. J. SMITH, M. B. KURTZMAN, *Assistant Examiners.*